United States Patent [19]

Ohashi et al.

[11] Patent Number: 4,530,826
[45] Date of Patent: Jul. 23, 1985

[54] METHOD FOR RECOVERING AND UTILIZING WASTE HEAT

[75] Inventors: Hiroyuki Ohashi, Yokohama; Shoichi Miyamoto, Machida; Shigeru Kurihara, Kawasaki, all of Japan

[73] Assignee: Asahi Kasei Kogyo Kabushiki Kaisha, Osaka, Japan

[21] Appl. No.: 527,449

[22] Filed: Aug. 29, 1983

Related U.S. Application Data

[63] Continuation of Ser. No. 326,780, Dec. 2, 1981, abandoned.

[30] Foreign Application Priority Data

Dec. 3, 1980 [JP] Japan ................... 55-170492
Dec. 3, 1980 [JP] Japan ................... 55-170494
Jul. 9, 1981 [JP] Japan ................... 56-107515

[51] Int. Cl.³ .............. C07C 120/14; C07C 121/32; C07C 51/16; C01C 3/04
[52] U.S. Cl. .................................. 423/376; 549/257; 260/465.3; 260/465.9; 562/545; 568/472; 568/476; 568/910; 423/392
[58] Field of Search .............. 260/465.3, 465.9; 562/545; 568/472, 910, 476; 549/257; 423/375, 376

[56] References Cited

U.S. PATENT DOCUMENTS 3,261,847 7/1966 Sullivan .................. 549/257
4,110,370 8/1978 Engelbach ................ 562/545
4,238,295 12/1980 Odom .................... 208/83
4,243,613 1/1981 Brockhaus et al. ........ 568/910 X
4,348,540 9/1982 Ferris et al. ............. 568/472

OTHER PUBLICATIONS

Article "Waste Heat Recovery Heat Pump", Hitachi Zosen (Japan).
Article "Absorption Type Refrigerator", Hitachi Zosen (Japan).

Primary Examiner—Joseph Paul Brust
Attorney, Agent, or Firm—Sprung Horn Kramer & Woods

[57] ABSTRACT

In a process for producing chemical substances comprising steps of cooling, condensing and solvent-absorbing the reaction product gas having a high temperature formed in a reactor, an absorption type refrigerator or an absorption type heat pump is driven by using, as the driving source, a heat source having such a temperature as not to be advantageous for the heat exchange in the process, which heat source has been taken out of the steps of cooling the reaction product gas, condensing it or solvent-absorbing it to obtain a refrigerant or a hot water having a temperature higher than the temperature of the heat source, and the refrigerant or the hot water is used as a cooling source or a heating source in the steps comprised in said process for producing chemical substances.

14 Claims, 10 Drawing Figures

METHOD FOR RECOVERING AND UTILIZING WASTE HEAT

This is a continuation of Application Ser. No. 326,780, filed Dec. 2, 1981, now abandoned.

This invention relates to a method for recovering and utilizing the waste heat having a relatively low level of temperature obtained in processes for producing chemical substances.

The object of this invention is to provide a process for producing chemical substances in which a heat in a low temperature region regarded as uneconomical or impossible to convert into steam, i.e. a low temperature heat of 130° C. or below, particularly 100° C. or below, is utilized effectively.

In many processes for producing chemical substances by high temperature reaction, the reaction product is a gaseous mixture. The high temperature gaseous mixture leaving the reactor is passed through a heat removal step and finally the objective substances are separated and collected from the mixture by condensation or solvent-absorption. The crude product containing the separated and collected objective substances is usually subjected to a purification step such as distillation or concentration by which it is separated and purified.

In general, the product gas of high temperature reaction has been utilized as a heat source for generating steam or pre-heating boiler water or reactants in a waste heat boiler or a heat-exchanger prior to being sent to a condensation or solvent-absorption step. However, a product gas at a temperature of 100° C. or less has been poor in utilizability, or the heat conductive area of a heat exchanger has had to be made remarkably great, and therefore, said product gas has not been able to be effectively utilized. Moreover, in order to condense or solvent-absorb a low temperature gas having a temperature of not more than 100° C., it has been necessary to further cool the gas to a lower temperature with a consumption of cooling water or the like, resulting in a double loss of energy. Particularly in processes for producing substances which are gaseous or liquid at a temperature lower than the boiling point of water at normal pressure, the steps of condensation, solvent-absorption, concentration, distillation and the like have been carried out at a temperature of not more than 100° C. so that a large amount of waste heat having a temperature of not more than 100° C. has been generated owing to latent heat and sensible heat.

Per ton of water, a temperature difference of 1° C. corresponds to 1,000 kcal. In processes for producing chemical substances consuming several hundred to several thousand tons of cooling water per day, it is no longer allowable in the present status of industry to overlook the recovery and utilization of heat sources having such a low level of temperature.

This invention has been made in view of the above-mentioned status, and the gist thereof consists in a method for recovering and utilizing waste heat in the production of a chemical substance comprising a step of cooling the high temperature reaction gas formed in a reactor, and condensing or solvent-absorbing a part of the components characterized by driving an absorption type refrigerator or an absorption type heat pump by utilizing a heat source taken out in the step of cooling the reaction product gas, the step of condensing it or the step of solvent-absorbing it and having such temperature as not to be advantageous for the heat-exchange in the process, thereby converting said heat source into a refrigerant or a hot water having a temperature higher than the heat source, and then using it as a cooling source or a heat source in steps comprised in the process system for producing said chemical substance.

According to this invention, the hitherto unutilized heat generated in the steps of cooling, condensation and absorption can be utilized for cooling or as a heat source for reboiler in the subsequent steps of concentration and distillation, and at the same time, the cooling water for cooling the reaction product can be economized, so that a great enhancement of energy efficiency can be achieved.

This method can be applied to processes for producing inorganic and organic chemical substances, such as production of acrylonitrile, methacrylonitrile and hydrogen cyanide by ammoxidation reaction; production of methacrylic acid and acrylic acid by the catalytic oxidation of isobutylene and propylene; production of formaldehyde by the oxidation of methanol; production of methanol from methane by the steam reforming process; production of maleic anhydride by the oxidation of benzene; production of nitric acid by the oxidation of ammonia; and the like.

In designing the process for producing the objective substance, many variations may be thought out. However, it is essential to the present process that the heat source taken out from the high temperature product gas just after leaving the reactor is not used but the heat having a temperature of not more than 100° C. taken out from the reaction gas which has been cooled to have a temperature close to the temperature level suitable for condensation or solvent-absorption is used as a heat source. That is, the high temperature gaseous mixture leaving the reactor is cooled to a temperature close to the temperature suitable for condensation or solvent-absorption by a one stage or multi-stage heat-exchanging means of gas/gas, steam/gas, water/gas or the like, and the heat taken out of this gas is utilized.

The absorption type refrigerator and heat pump are advantageous in that they can utilize even a low temperature driving source with a high heat efficiency. They can utilize such a driving source of not more than 100° C. as to have hitherto been ignored substantially with a heat efficiency of about 50-80%, and moreover they are suitable for a large scale of apparatus.

With reference to the accompanying drawings, the prior process and the method of this invention will be illustrated concretely by taking the production of acrylonitrile as an example.

In the accompanying drawings.

In FIGS. 1 to 9b, the numerals refer to the followings: 1—a reactor, 2—a heat exchanger, 3—a quenching column, 4—a line, 5—a line, 6—a cooler, 7—a line, 8—an absorption column, 9—a cooler, 10—a line, 11—a line, 12—a heat-exchanger, 13—a recovery column, 14—a reboiler, 15—a line, 16—a line, 17—a line, 18—an acetonitrile-stripping column, 19—a condenser, 20—a decanter, 21—a dehydrogen cyanide column, 22—a reboiler, 23—a condenser, 24—a line, 25—a dehydration column, 26—a reboiler, 27—a condenser, 28—a product column, 29—a reboiler, 30—a condenser, 31—an absorption type refrigerator, 32—a cooler, 33—an absorption type heat pump, 34—a storage tank, 35—a heat-exchanger, 36—a heat-exchanger, 37—a line, 38—a methacrolein reactor, 39—a methacrylic acid reactor, 40—a high temperature scrubber, 41—a line, 42—a low temperature scrubber, 43—a line, 44—a cooler, 45—a methacrolein-recovery column, 46—an absorption type heat pump, 47—a reactor, 48—a waster heat boiler, 49—an ammonia absorption column, 50—a cooling column, 51—an absorption column, 52—a cooler, 53—a rectifying column, 54—a partial condenser, 55—a condenser, 56—a tank, 57—an absorption type refrigerator, 58—a preheater, 59—a reactor, 60—a waste heat boiler, 61—a first absorption column, 62—a purifying apparatus, 63—a purifying apparatus, 64—a second absorption column, 65—a cooler, 66—a cooler, 67—a line, 68—an absorption type refrigerator, 69—an acrolein reactor, 70—an acrylic acid reactor, 71—a heat-exchanger, 72—an absorption column, 73—a line, 74—an absorption type refrigerator, 75—an absorption type heat pump, 76—an absorption type refrigerator.

Figure 1:
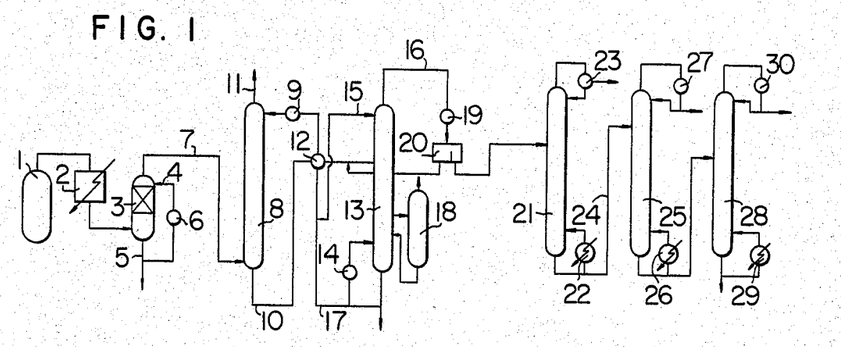
FIG. 1 is a flow sheet illustrating the prior process for producing acrylonitrile.

In FIG. 1, propylene, ammonia and air are continuously fed to a reactor 1 and subjected to ammoxidation reaction at a high temperature in the gas phase in the presence of an oxidation catalyst to produce a mixture of unreacted materials and reaction products such as acrylonitrile, acetonitrile, hydrogen cyanide and high boiling organic compounds. This gaseous mixture having a high temperature is sent through a heat exchanger 2 to a quenching column 3, where it contacts with the circulating cooling water sent from a line 4 and flowing down from the top of the column, to be cooled to give a low temperature gas. In this step of cooling, the high boiling organic compounds and the water formed by reaction are caught by the circulating water and removed. Optionally, a mineral acid is added to the circulating water, with which the unreacted ammonia in the reaction gas is removed. The circulating water whose temperature has thus been elevated is discharged from the bottom through a line 5, cooled in a cooler 6 and then circulated into the top of the column through a line 4, while a part of it is discharged from the system.

The gas which has left the top of the quenching column 3, and has been introduced through a line 7, into the lower part of an absorption column 8 is contacted with the absorption water which has been cooled in a cooler 9 and allowed to flow down from the top in the column, so that acrylonitrile, acetonitrile and hydrogen cyanide are absorbed by the absorption water. This absorption solution is withdrawn as a bottom stream through a line 10, while the gas not absorbed is discharged from the top of the column through a line 11.

The absorption solution is heated while passing through a heat-exchanger 12, fed to a recovery column 13 from a somewhat higher position than the column, and heated by a reboiler 14. Usually, the recovery column has at least 50 trays and preferably 60–100 trays. The absorption solution is counter-currently contacted with the solvent water sent to the upper part of the column via a line 15 and is subjected to an extractive distillation, so that a crude acrylonitrile vapor containing hydrogen cyanide and water is distilled out of the top via a line 16, while the solvent water is withdrawn from the bottom via a line 17. The major part of the acetonitrile present in the absorption solution is separated by distillation in an acetonitrile-stripping column 18 attached to the recovery column 13. The solvent water withdrawn from the line 17, which is substantially free from acetonitrile, is sent via a line 15 to the recovery column 13. At the same time, a part of the solvent water is cooled while passing through the heat-exchanger 12, and then additionally cooled by a cooler 9, after which it is fed to an absorption column 9 as an absorbion water. The crude acrylonitrile vapor distilled out of a line 16 is cooled by a condenser 19. The condensed liquid is separated into oil layer and water layer in a decanter 20. The oil layer is sent to a de-hydrogen cyanide column 21, while the aqueous layer is returned to the recovery column 13.

The de-hydrogen cyanide column 21 is heated by a reboiler 22 to carry out distillation, by which the hydrogen cyanide is distilled out of the top and is fractionally condensed in a condenser 23 to separate hydrogen cyanide vapor, while the bottom stream is sent to a dehydration column 25 via a line 24. The dehydration column 25 is heated by a reboiler 26 to carry out distillation, by which the vapor distilled out of the top of the column is condensed in a condenser 27 to be separated into oil layer and water layer, and the oil layer is dehydrated (not shown in the drawings), while the bottom stream is sent to a product column 28. The product column 28 is heated by a reboiler 29 to carry out distillation, by which the vapor distilled out of the top of the column is condensed at a condenser 30 to give an acrylonitrile having a product grade. Optionally, it is additionally cooled for the purpose of maintaining the product quality (not shown in the drawings). The bottom stream is withdrawn and discharged.

The conventional process for producing acrylonitrile is as mentioned above. This process involves many steps of heating and cooling. That is, the recovery column 13, the de-hydrogen cyanide column 21, the dehydrating column 25 and the product column 28 have the reboilers 14, 22, 26 and 29 and the condensers 19, 23, 27 and 30, and the quenching column 3 and the absorption column 8 have the coolers 6 and 17. In order to enhance the energy efficiency of such a process involving repetition of heating and cooling, various measures have been taken hitherto. For example, in Japanese Patent Application Kokai (Laid-Open) No. 81,848/80, the use of the solvent water leaving the recovery column as a heat source for the reboiler in the de-hydrogen cyanide column or the product column is proposed. However, it is stated there that, according to this method, the liquid whose temperature is below the heat source temperature of the reboiler is sent to the absorption column as a solvent water in the typical example. That is, the heat energy below the heat source temperature of the reboiler is not utilized effectively, and it is rather cooled with a consumption of cooling heat source in order to convert it to an absorption water for the absorption column. Thus, the utilization of heat sources having a low temperature (90° C. or below) has been ignored hitherto, and there is also an additional fault that utilization of such a heat source as low temperature water such as absorption water results rather in a consumption of much cooling heat source.

On the other hand, for the purpose of cooling, the cooling water (40° C. or below) or sometimes a brine (25° C. or below) is circulated into the condenser and cooler in the process. Though the cooling water can be produced by means of a water-cooling column, the brine having a lower temperature is produced by driving a refrigerator. Thus, in the system of the conventional process, an external energy has been consumed doubly for the purpose of heating and cooling, i.e. for generating steam and regenerating a refrigerant such as cooling water or brine.

This invention has been made in view of the above-mentioned circumstances, and the gist thereof consists in a process for producing an unsaturated nitrile which comprises cooling, with water in a quenching column, a reaction mixture comprising the unsaturated nitrile, a saturated nitrile and hydrogen cyanide formed by the ammoxidation reaction of an olefin, absorbing the reaction mixture into absorption water in an absorption column, subjecting the resulting absorption solution to an extractive distillation in a recovery column by the use of solvent water, withdrawing a distillate comprising the unsaturated nitrile and the hydrogen cyanide from the top of the column, separating by distillation the hydrogen cyanide and water from said distillate in distillation columns in a de-hydrogen cyanide column, a dehydrating column, and a product column, to obtain the unsaturated nitrile, removing acetonitrile from the liquid taken out from a lower part of the recovery column to obtain solvent water and circulating said solvent water as the absorption water in the absorption column and as the solvent water in the recovery column, characterized by driving an absorption type refrigerator or an absorption type heat pump by using, as a driving source, the heat source having a temperature of not more than 100° C. consisting of the circulating water effluent from the quenching column after elevation of temperature, the solvent water circulated into the absorption column as an absorption water or the vapor distilled out of the top of the recovery column, thereby obtaining a refigerant or hot water having a temperature higher than the temperature of the driving heat source, and using the refrigerant thus obtained for cooling at least one member selected from the group consisting of the absorption water in the absorption column, the overhead vapor of the de-hydrogen cyanide column and the unsaturated nitrile withdrawn from the product column and/or using the hot water thus obtained as a heat source for at least one member selected from the group consisting of distillation columns in the de-hydrogen cyanide column, the dehydration column and the product column.

According to this process, the liquids or vapors having a relatively low temeprature (100° C. or below) which have hitherto been unusable effectively can be used as a driving source. Accordingly, the energies can be utilized with a high efficiency. Further, since the temperature of the liquids or vapors per se is lowered with a release of heat energy, so that the amount of refrigerant or cooling water for cooling or condensing the liquids or vapors can be reduced.

This invention is further explained in more detail below referring to Examples, which are not by way of limitation but only by way of illustration.

EXAMPLE 1

Figure 2:
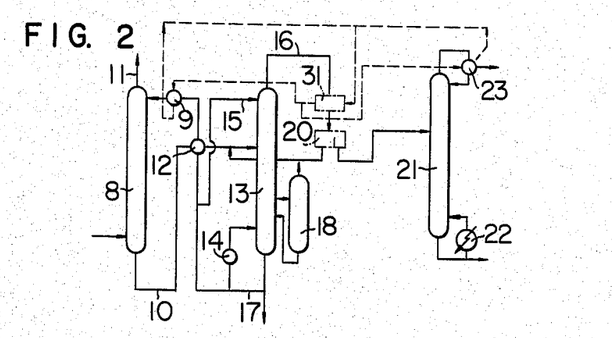
FIGS. 2, 3, 4 and 5 are flow sheets illustrating the process for producing acrylonitrile according to this invention.

This is an example in which, as shown in FIG. 2, the crude acrylonitrile vapor distilled out of the top of recovery column 13 was used as a driving source for driving the absorption type refrigerator 31, and the refrigerant thus obtained was used for cooling, at the cooler 9, the absorption water in the absorption column 8 or fractionally condensing, at the condenser 23, the hydrogen cyanide vapor distilled out of the top of the de-hydrogen cyanide column 21.

The product gas obtained by ammoxidation of propylene was quenched, after which acrylonitrile, hydrogen cyanide and acetonitrile were absorbed by the absorption water in the absorption column to separate them from inert gases. At this time, the possibility of enhancing the absorption efficiency and achieving a sufficient absorption with a small amount of the absorption water was dependent on the possibility of lowering the temperature of the absorption water. For this reason, it had hitherto been conventional to cool the absorption water with a combination of cooling-water-type coolers or brine-type coolers. Since the absorption water was used in a large amount, the cooling thereof necessitated a large quantity of a cooling heat source.

In the de-hydrogen cyanide column 21, acrylonitrile, hydrogen cyanide and water were fed, and the hydrogen cyanide was obtained from the top, and the acrylonitrile from the bottom. Since the hydrogen cyanide distilled out of the top had a boiling point as low as 27° C. (760 mm Hg), it was desired to use a refrigerant having a temperature as low as possible for the condensation of the overhead vapor in order to obtain the hydrogen cyanide with a high purity in a high yield. For this reason, a brine prepared by means of a refrigerator had been used as the refrigerant in many cases.

The freezing loads for the brine required for cooling the absorption water and condensing the hydrogen cyanide had been usually as follows:

| | |
|---|---|
| For absorption water: | $50 \times 10^3$ Kcal/acrylonitrile T |
| For condensing hydrogen cyanide: | $100 \times 10^3$ Kcal/acrylonitrile T |
| Total: | $150 \times 10^3$ Kcal/acrylonitrile T. |

The loads had been obtained with a compression refrigerator using a steam turbine or motor as the driving source or with an absorption type refrigerator using steam or a fuel as the driving source.

In this example, the latent heat of condensation of the overhead vapor of the recovery column which had not been utilized usually because of low temperature (60°–90° C.) was utilized for driving an absorption type refrigerator to prepare a refrigerant consisting of cold water having a temperature of 5°–25° C., and the refrigerant was used for cooling the absorption water and condensing the hydrogen cyanide gas. In this case, the utilizable heat quantity (mainly, the latent heat of condensation) of the overhead vapor of the recovery column was $250 \times 10^3$ Kcal/acrylonitrile T, whose 80% could be converted to a freezing capacity by the use of an absorption type refrigerator so that a freezing capacity of $200 \times 10^3$ Kcal/acrylonitrile T can be obtained. Owing thereto, the above-mentioned necessary freezing load could be decreased and economization of energy could be achieved.

EXAMPLE 2

Figure 3:
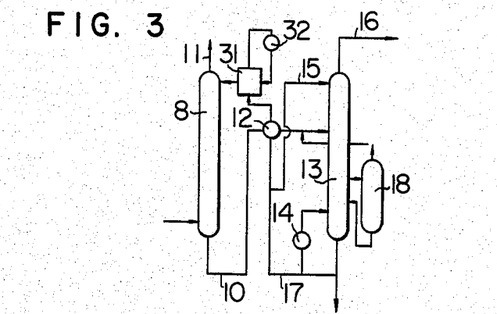

This is an example in which, as shown in FIG. 3, the solvent water having a high temperature (110°–130° C. effluent from the bottom of the recovery column was cooled to a temperature of 40°–90°C. by utilizing it as a preheating source for the absorption solution in the heat exchanger 12 and then it was utilized as a driving source for driving an absorption type refrigerator 31.

In one example, the solvent water which had been cooled to 65° C. was additionally cooled to 55° C. to release a heat energy, with which the absorption type refrigerator 31 was driven. This solvent water was cooled to 35° C. with a cooler 32 using cooling water, and then further cooled either directly with said absorption type refrigerator 31 or indirectly by means of its refrigerant. Thus, the temperature of the solvent water could be loweted to 30° C. By this method, the cooling to such a low temperature as had not been attained with the conventional cooler 32 using cooling water has become possible, and the waste heat in the process can be utilized without necessitating any new external energy.

EXAMPLE 3

Figure 4:
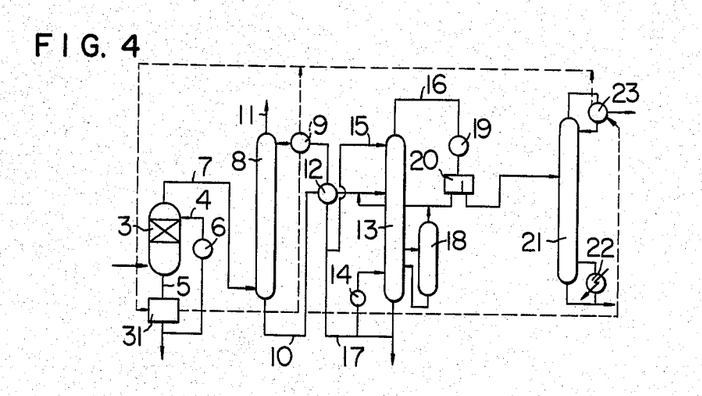

This is an example in which, as shown in FIG. 4, the circulating cooling water discharged from the bottom of the quenching column 3 whose temperature had been elevated was used as a driving source for driving an absorption type refrigerator 31 to obtain a refrigerant. The circulating water discharged from the bottom had a temperature of about 60° C. In the conventional process, the heat thereof was not utilized, and it was cooled in the cooler 6 and then circulated and used. According to the method of this invention, the refrigerant was regenerated and, at the load of the cooler 6 could be decreased. The refrigerant could be used for cooling the absorbing water cooler 9 in the absorption column or the condenser 23 in the de-hydrogen cyanide column. As a result, the energy for regenerating the refrigerant and the energy for regenerating the cooling water could be economized.

EXAMPLE 4

Figure 5:
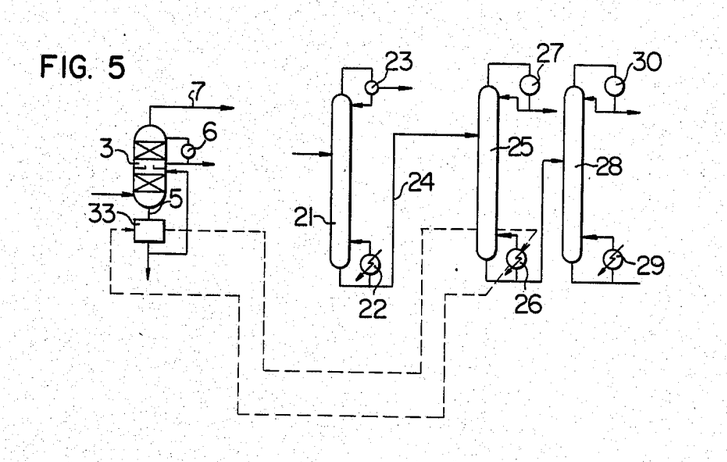

This is an example in which, as shown in FIG. 5, the quenching column 3 was worked by a 2-stage cooling method and the circulating cooling water discharged from the bottom of the lower cooling stage whose temperature had been elevated was used as a driving source for driving the absorption type heat pump 33 to obtain hot water. The circulating water effluent from the bottom had a temperature of about 85° C., from which hot water having a temperature of 110°–115° C. could be obtained. It could be utilized as a heat source for the reboilers in the distillation columns in the dehydrating column 25, the product column 28, the de-hydrogen cyanide column 21.

According to this method, the steam used in the distillation columns could be economized and at the same time the energy necessary for the regeneration of the cooling water for removing heat from the quenching column could also be economized.

This invention is as mentioned above. According to this invention, the low temperature heat sources which have never been utilized in the conventional method can be used for regenerating a refrigerant or hot water which can be utilized for cooling or heating the system, so that the energy for refrigerant or the energy for heating can be economized. Further, since the cooling load for the absorption water and the circulating cooling water for the quenching column can be decreased, the energy necessary for regenerating the cooling water can be economized and a high energy efficiency can be achieved.

EXAMPLE 5

Figure 6:
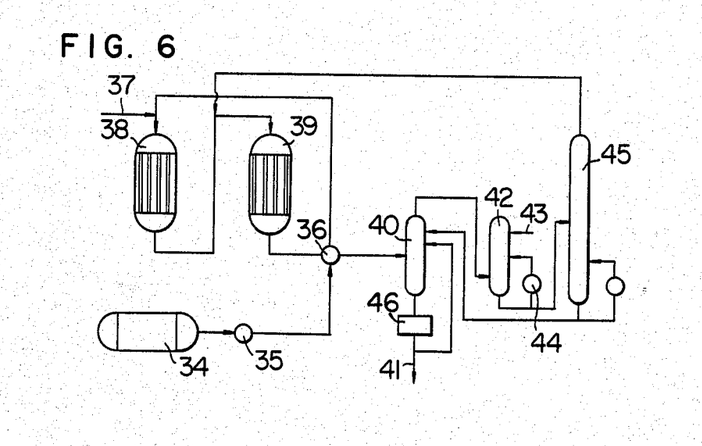
FIG. 6 is a flow sheet illustrating the process for producing methacrylic acid according to this invention.

This is an example in which, as shown in the flow sheet of FIG. 6, the method of this invention was applied to the synthesis of methacrylic acid by the 2-stage oxidation of isobutylene. According to this process, the isobutylene in a storage tank 34 was heated and vaporized in a heat exchanger 35, additionally heated by passing it through a heat exchanger 36, and mixed with the steam and air supplied from a line 37, after which it entered a methacrolein reactor 38. In the reactor 38, the mixture was heated to a temperature of not less than 300° C. and reacted in the presence of a catalyst to form methacrolein. The product gas containing methacrolein was sent to a methacylic acid reactor 39 where it was heated to a temperature of not less than 320° C. and reacted in the presence of a catalyst to be converted into methacrylic acid. The product gas was passed through the heat exchanger 36 and sent to a high temperature scrubber 40, where it was cooled by contacting countercurrently with the circulating cooling water flowing down from top of the column and at the same time methacrylic acid was absorbed by the circulating water. A part of the methacrylic acid was sent through a line 41 to the methacrylic acid purifying step where purified methacrylic acid was obtained (the purifying apparatus is not shown in the drawings).

The gas distilled out of the top of the high temperature scrubber 40 was sent to a low temperature scrubber 42 where it was contacted countercurrently with the low temperature pure water supplied from a line 43 and flowing down in the scrubber 42, and with the circulating water which had been cooled in a cooler 44. Thus, the methacrolein in the gas was absorbed, and the unabsorbed gas was discharged from the top of the column. The solution which had absorbed methacrolein was distilled in a methacrolein-recovery column 45. The methacrolein thus obtained was returned to a methacrylic acid-reactor 39, and the bottom stream was sent to the high temperature scrubber as a cooling water.

In this example, an absorption type heat pump 46 was placed in the route of the circulating water discharged from the bottom of the high temperature scrubber 40. The temperature of the circulating water was elevated to about 100° C. (it may be somewhat varied with the temperature of gas and the amount of circulating water). By using it as a heat source, the absorption type heat pump was driven to obtain hot water having a temperature of about 120° C. This hot water was effectively used as a heat source for the purification step (not shown in the drawings) of the aqueous methacrylic acid solution effluent from the line 41.

In the conventional process, the circulating water discharged from the high temperature scrubber was circulated after being cooled with a cooler. In this example, however, the temperature of the circulating water was additionally elevated and then effectively utilized as heat sources in the system to save the external energy. Simultaneously, the energy for regenerating the cooling water to be passed through the cooler became unnecessary.

Though a hot water produced by means of the absorption type heat pump in this example, it was also possible to produce a refrigerant by providing an absorption type refrigerator. This refrigerant was effectively usable for cooling the methacrylic acid in the methacrylic acid purifying step.

EXAMPLE 6

Figure 7:
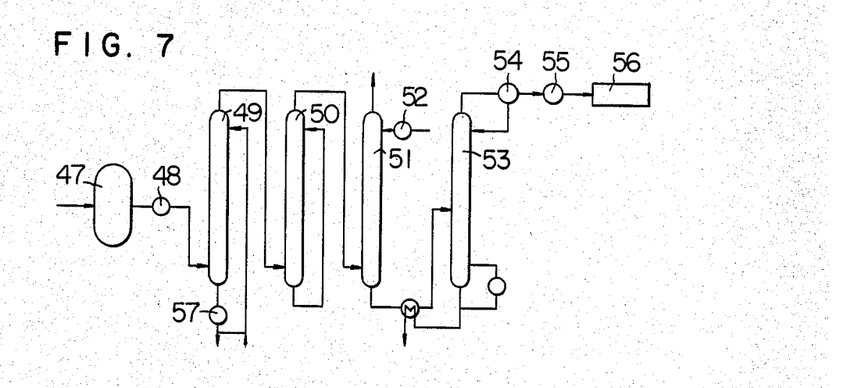
FIG. 7 is a flow sheet illustrating the process for producing hydrogen cyanide according to this invention.

This is an example in which, as shown in the flow sheet of FIG. 7, the method of this invention was applied to the production of hydrogen cyanide by the ammoxidation of methane. According to this process, the methane, ammonia and air continuously fed to a reactor 47 underwent the ammoxidation reaction in the presence of a catalyst at a high temperature of 1,000°–1,100° C. to yield a gaseous mixture comprising mainly hydrogen cyanide and further containing unreacted ammonia and the like. The gaseous mixture was passed through a waste heat boiler 48 and entered into an ammonia-absorption column 49. In the ammonia-absorption column 49, an aqueous solution of sulfuric acid was allowed to flow down from the top of the column, so that the gas was cooled and simultaneously the unreacted ammonia was converted to ammonium sulfate, which was discharged and recovered from the bottom of the column. The aqueous solution of sulfuric acid was circulated and used with a replenishment of some quantity. The gas from which ammonia had been removed was entered to a cooling column 50 where it was cooled while contacting with the circulating cooling water flowing down from the top, after which it was introduced into an absorption column 51 and absorbed by the low temperature absorbing water which had been cooled in a cooler 52 and allowed to flow down from the top of the column. The absorption solution was rectified in a rectifying column 53. The hydrogen cyanide distilled out of the top of the column was subjected to partial condensation in a partial condenser 54 to separate water, after which the vapor of hydrogen cyanide was condensed in a condenser 55. The hydrogen cyanide thus obtained was stored in a tank 56 cooled with a refrigerant. The bottom stream was passed through the heat exchanger to preheat the absorption solution and then discharged.

In this production process, the high temperature product gas leaving the reactor 47 had been subjected to an effective utilization of heat in the waste heat boiler 48 to lower the temperature, after which it was introduced into the ammonia-absorption column 49. However, the ammonia absorption column 49 was maintained at a considerably high temperature in order to prevent the dissolution of hydogen cyanide in the circulating aqueous sulfuric acid solution which flowed down in the column, so that the temperature of the circulating aqueous sulfuric acid solution was elevated to not less than 60° C. In the conventional process, the heat was taken out with a cooler provided in the route of circulation. In the method of this invention, an absorption type refrigerator 57 was placed at a position close to the hole for discharging the aqueous sulfuric acid solution from the bottom of the ammonia-absorption column 49 and a refrigerant was produced therewith by using the aqueous sulfuric acid solution, whose temperature had been elevated as a driving source.

This refrigerant was used as a refrigerant for at least one member selected from the group consisting of the cooler 52 in the absorption column, and the partial condenser 54, the condenser 55 and the tank 56 in the distillation columns, and the like, so that the external energy consumed in the conventional process for regenerating this refrigerant could be economized. Simultaneously, the energy for regenerating the cooling water in the ammonia-absorption column became unnecessary. Thus, a high energy efficiency could be achieved.

EXAMPLE 7

Figure 8:
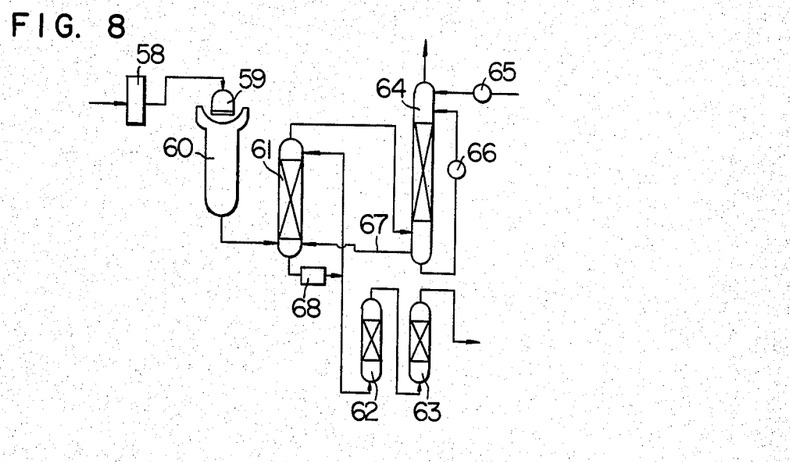
FIG. 8 is a flow sheet illustrating the process for producing formaldehyde according to this invention.

This is an example in which, as shown in the flow sheet of FIG. 8, the method of this invention was applied to the production process of formaldehyde by the oxidation of methanol. According to this process, a gaseous mixture of methanol and air was preheated in a preheater 58 and continuously fed to a reactor 59, where it was contacted with a catalyst and heated to 600°–650° C., whereby it was converted to a gaseous mixture comprising formaldehyde, small amounts of formic acid and esters, and unreacted compounds. This gas was sent to a waste heat boiler 60, where it generated steam and its own temperature descended to about 100° C., after which it entered the first absorption column 61. In the first absorption column 61, it was contacted with the low temperature absorbing water flowing down from the top. Thus, the formaldehyde was absorbed, withdrawn from the bottom of tower and sent to purifying apparatuses 62 and 63 for the removal of impurities, whereby the product was obtained. A part of the solution having absorbed therein the formaldehyde withdrawn from the bottom of the column was circulated and supplied from the top of the columns as an absorbing water. The gas distilled out of the top of the first absorption column 61 was sent to the second absorption column 64, where it was contacted with the absorption water which had been cooled in a cooler 65 and was allowed to flow down from the top, as well as with the circulating water which had been cooled in a cooler 66. Thus, the residual formaldehyde was completely absorbed. The solution having absorbed therein formaldehyde was returned to the first absorption column 61 via a line 67, and the gas distilled out of the top of the column was discharged.

In practising his example according to the method of this invention, an absorption type refrigerator 68 was placed in the route of the solution having absorbed therein formaldehyde effluent from the bottom of the absorption column 61, and was driven by using the solution having an elevated temperature as a driving source, whereby a refrigerant was produced. This refrigerant was used for cooling the coolers 65 and 66, so that the external energy for regenerating the refrigerant could be saved. Further, though the solution having absorbed therein formaldehyde was cooled by using the cooling water in the conventional process, this cooling water and the energy for regererating the cooling water were made unnecessary in the process of this invention.

EXAMPLE 8

Figure 9A:
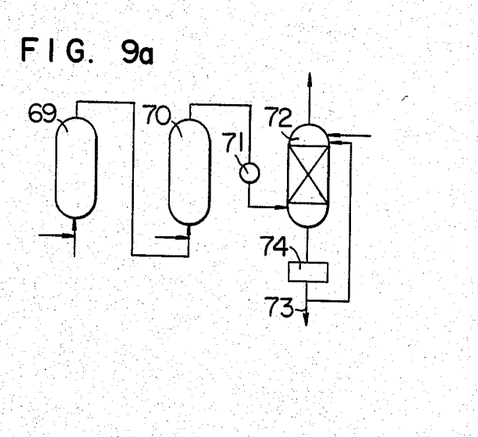
FIG. 9 is a flow sheet illustrating the process for producing acrylic acid according to this invention as well as its modification.

This is an example in which this invention was applied to a process for the synthesis of acrylic acid by a 2-stage oxidation of propylene. The process for the synthesis of acrylic acid was as shown in FIG. 9a. Propylene and air were continuously fed to an acrolein reactor 69, heated and reacted in the presence of a catalyst to form acrolein and sent to an acrylic acid-reactor 70. In the acrylic acid reactor 70, the oxidation of acrolein progresses in the presence of a catalyst so that the acrolein was converted to acrylic acid. The product gas of the reactor 70 was passed through a heat exchanger 71, where its temperature was lowered, after which it was sent to an absorption column 72, where it was countercurrently contacted with the absorbing water flowing down from the top of the column so that the acrylic acid was absorbed by the absorbing water. A part of the absorbing water discharged from the bottom of the column was withdrawn from a line 73, while the remainder was circulated and returned to the top of the column. The aqueous acrylic acid solution withdrawn from the line 73 was transferred to a purification step (not shown in the drawings), where it was dehydrated and purified to give purified acrylic acid.

In this example, an absorption type refrigerator 74 was provided in the discharging route of the circulating water at the bottom of the absorption column and driven by using the circulating water, whose temperature was elevated to about 60° C., as a driving source to obtain a refrigerant. This refrigerant was effectively usable for the cooling in the purification step of the aqueous acrylic acid solution or for cooling the stored purified acrylic acid, and the external energy for regenerating the refrigerant could be saved. Further, since the temperature of the circulating water in the absorption column was lowered upon driving a refrigerator 74, the use of a cooler and cooling water became unnecessary and the energy for regenerating the cooling water also became unnecessary.

Figure 9B:
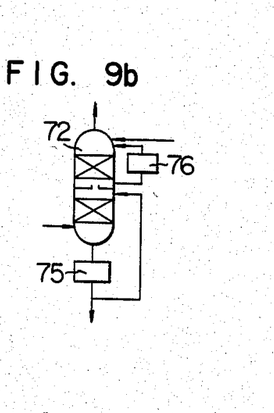

FIG. 9b also illustrates an example of this invention to another process for the synthesis of acrylic acid, wherein the absorption tower 72 is constructed of 2 stages. An absorption type heat pump 75 placed in the route of the circulating water for the lower stage and an absorption type refrigerator 76 placed in the route of the circulating water for the upper stage were driven by using the respective circulating waters, whose temperatures had been elevated, as a driving source to obtain a hot water and a refrigerant, respectively. The circulating water of the lower stage was at a temperature of about 85° C., from which was obtained a hot water having a temperature of 110°–115° C. This hot water was effectively usable as a heat source of the reboiler in the distillation column in the acrylic acid purification step. The refrigerant could be utilized effectively in the same manner as above.

This invention is as mentioned above. Since according to this invention the heat sources which have hitherto not been utilizable effectively can be converted to a refrigerant or hot water having a higher temperature than the temperature of the heat source and they can be utilized as a cooling source or heating source in the system, the energy efficiency of a production process, involving the steps of cooling, condensing or solvent-absorbing the high temperature gas formed by reaction and hence consuming a very large quantity of energy, can be enhanced to a great extent.

What is claimed is:

1. A method for recovering and utilizing waste heat in the production of an unsaturated nitrile by cooling with water in a quenching column a reaction mixture comprising an unsaturated nitrile, a saturated nitrile and hydrogen cyanide formed by the ammoxidation reaction of an olefin, absorbing reaction mixture into an absorption water in an absorption column, subjecting the resulting absorption solution to an extractive distillation by the use of solvent water in a recovery column, thereby obtaining a distillate comprising the unsaturated nitrile and hydrogen cyanide from the top of the column, and removing by distillation the hydrogen cyanide and water from the distillate in distillation columns in a de-hydrogen cyanide column, a dehydration column, a product column wherein the solvent water withdrawn from the side part of the stripping column and freed substantially from the fraction comprising the unsaturated nitrile and hydrogen cyanide contained in the feed to the recovery column without passing through an acetonitrile-stripping column is circulated as the absorption water in the absorption column or the solvent water withdrawn from the lower part of the recovery column and freed from acetonitrile substantially by passing through an acetonitrile stripping column is circulated as the solvent water in the recovery column and/or as the absoprtion water in the absorption column, characterized in that an absorption refrigerator or an absorption heat pump is driven by using, as its driving source, at least one heat source at a temperature of not more than 100° C. selected from the group consisting of the circulating water in the quenching column, the solvent water circulated as the solvent water in the absorption solumn and the recovery column, the vapor distilled out from the top of the recovery column and the vapor distilled out from the top of the dehydration column, to obtain a refrigerant or hot water having a temperature higher than the temperature of the heat source, and said refrigerant is used for cooling at least one member selected from the group consisting of the absorption water in the absorption column, the overhead vapor of the de-hydrogen cyanide column and the unsaturated nitrile withdrawn from the product column and/or hot water is used as at least one heat source selected from those of the distillation columns of the de-hydrogen cyanide column, the dehydration column, and the product column.

2. A method for recovering and utilizing waste heat according to claim 1, wherein said absorption water in the absorption column is used as a driving source for driving an absorption refrigerator either to cool the absorption column per se directly or to obtain a refrigerant for cooling the absorption water per se indirectly, and the absorption water thus additionally cooled is used as the absorption water in the absorption column.

3. A method for recovering and utilizing waste heat according to claim 1, wherein the vapor distilled out of the recovery column is said driving source in the refrigerator.

4. A method for recovering and utilizing waste heat according to claim 1, wherein solvent water effluent from the bottom of the recovery column is utilized as a preheat source for the absorption solution in a heat exchanger and thereafter said solvent water is utilized as said driving source in said refrigerator.

5. A method for recovering and utilizing waste heat according to claim 4, wherein said solvent water is withdrawn from the refrigerator and directed to a cooler using cooling water and thereafter said solvent water is further cooled either directly with said absorption refrigerator or indirectly by means of its refrigerant.

6. A method for recovering and utilizing waste heat according to claim 1, wherein the circulating water in the quenching column is said driving source.

7. A method for recovering and utilizing waste heat according to claim 6, wherein said refrigerant is used to cool at least one of the absorption water in the absorption column and the overhead vapor of the de-hydrogen cyanide column.

8. A method for recovering and utilizing waste heat according to claim 1, wherein the circulating water in the quenching column is cooled up by a 2-stage cooling quenching tower and the circulating water discharged from the bottom of the lower cooling stage of the quenching tower is the driving source for the heat pump.

9. A method for recovering and utilizing waste heat according to claim 8, wherein hot water from said heat pump is utilized as a heat source for reboilers in at least one of the distillation columns in the dehydrating column, the product column and the de-hydrogen cyanide column.

10. A method of recovering and utilizing waste heat in the synthesis of methacrylic acid by a 2-stage oxidation of isobutylene wherein isobutylene is preheated and vaporized, mixed with steam and air, directed to a methacrolein reactor wherein the mixture is heated to a temperature of not less than 300° C. in the presence of a catalyst to form methacrolein, said methacrolein being directed to a methacrylic acid reactor wherein the methacrolein is heated to a temperature of not less than 320° C. in the presence of a catalyst to convert the methacrolein to methacrylic acid, said method of recovering and utilizing waste heat comprising directing the methacrylic acid through a heat exchanger to heat the isobutylene, passing said methacrylic acid from said heat exchanger into a high temperature scrubber wherein said methacrylic acid is cooled by contacting the acid countercurrently with circulating cooling water, passing circulating water at a temperature of not more than 100° C. discharged from the bottom of the high temperature scrubber into an absorption heat pump to produce hot water, said hot water being used for the purification of the aqueous methacrylic acid solution effluent from the high temperature scrubber, directing gas distilled out of the top of the high temperature scrubber to a low temperature scrubber wherein the gas is contacted countercurrently with low temperature water and wherein water is withdrawn from the low temperature scrubber, cooled in a cooler and directed back to the low temperature scrubber, passing solution from the low temperature scrubber into a methacrolein-recovery column whereby to obtain methacrolein, returning the methacrolein to the methacrylic acid reactor, and directing the bottom effluent of the recovery column to the high temperature scrubber as cooling water.

11. A method for recovering and utilizing waste heat in the production of hydrogen cyanide by the ammoxidation of methane comprising feeding methane, ammonia and air to a reactor in the presence of a catalyst to yield a gaseous mixtute comprising mainly hydrogen cyanide and further containing unreacted ammonia, passing the gaseous mixture through a waste heat boiler, passing the mixture from the boiler to an ammonia-absorption column, circulating an aqueous solution of sulfuric acid through the top of an ammonia-adsorption column so as to flow down the ammonia-adsorption and cool the gas and simultaneously convert the unreacted ammonia to ammonium sulfate, said sulfuric acid solution at a temperature of not more than 100° C. passing from the bottom of the ammonia-adsorption column through an adsorption refrigerator and circulating back to the ammonia-adsorption column so as to produce a refrigerant, discharging the ammonium sulfate from the bottom of the ammonia-adsorption column, directing the gas from which ammonia had been removed in the ammonia-adsorption column to a cooling column wherein the gas is cooled while in contact with circulating cooling water flowing down from the top of the cooling column, directing cooled gas from the cooling column to an adsorption column wherein low temperature absorbing water enters the top of the adsorption column and flows down the adsorption column, directing an absorption solution from the bottom of the adsorption column to a rectifying column, subjecting the hydrogen cyanide distilled out of the top of the rectifying column to partial condensation in a partial condenser to separate water, directing the hydrogen cyanide from the partial condenser to a condenser to condense the hydrogen cyanide, passing the condensed hydrogen cyanide to a tank, directing a bottom stream from the rectifying column to a heat exchanger to preheat the absorption solution, and utilizing said refrigerant produced in the refrigerator in at least one member of the group consisting of the cooler in the adsorption column, the partial condenser the condenser and the tank.

12. A method for recovering and utilizing heat in the production of formaldehyde by the oxidation of methanol including preheating a first gaseous mixture of methanol and air, feeding said preheated mixture into a reactor in the presence of a catalyst whereby to convert the first gaseous mixture into a second gaseous mixture comprising formaldehyde, a small amount of formic acid and esters and unreacted compounds, directing said second gas to a waste heat boiler to generate steam, passing said second gaseous mixture from said boiler to a first absorption column wherein said second gaseous mixture is contacted with low temperature absorbing water to absorb formaldehyde, withdrawing a formaldehyde containing stream at a temperature of not more than 100° C. from the first absorption column and directing said stream through an absorption refrigerator so as to drive the refrigerator and produce a refrigerant, directing the gas distilled out of the top of the first absorption column to a second absorption column where it it contacted with absorption water cooled in a first cooler and contacted with circulating water cooled in a second cooler, said solution having formaldehyde absorbed therein being returned to the first absorption column, said refrigerant used for cooling said first and second coolers.

13. A method of recovering and utilizing waste heat in the synthesis of acrylic acid by a 2-stage oxidation of proplylene comprising feeding propylene and air to a first reactor in the presence of a catalyst to form acrolein, directing the acrolein to a second reactor in the presence of a catalyst to convert the acrolein to acrylic acid by oxidation, passing the acrylic acid through a heat exchanger to cool the acrylic acid, directing the cooled acrylic acid to an absorption column wherein the acrylic acid is countercurrently contacted with absorbing water flowing down from the top of the column whereby the acrylic acid is absorbed by the absorbing water, withdrawing the absorbing water from the bottom of the column and directing said withdrawn water at a temperature of not more than 100° C. through an absorption refrigerator to drive the refrigerator and to produce a refrigerant, circulating a part of the absorbing water back to the top of the column and directing the remainder of the absorbing water to a purification step.

14. A method for recovering and utilizing waste heat in the synthesis of acrylic acid according to claim 13, wherein said column has an upper stage and a lower stage and an absorption heat pump is placed in the route of the circulating water discharged from the lower stage and an absorption refrigerator is placed in the route of the circulating water for the upper stage, a hot water stream being obtained in the heat pump and a refrigerant being obtained in the refrigerator.

* * * * *